Patented Nov. 30, 1926.

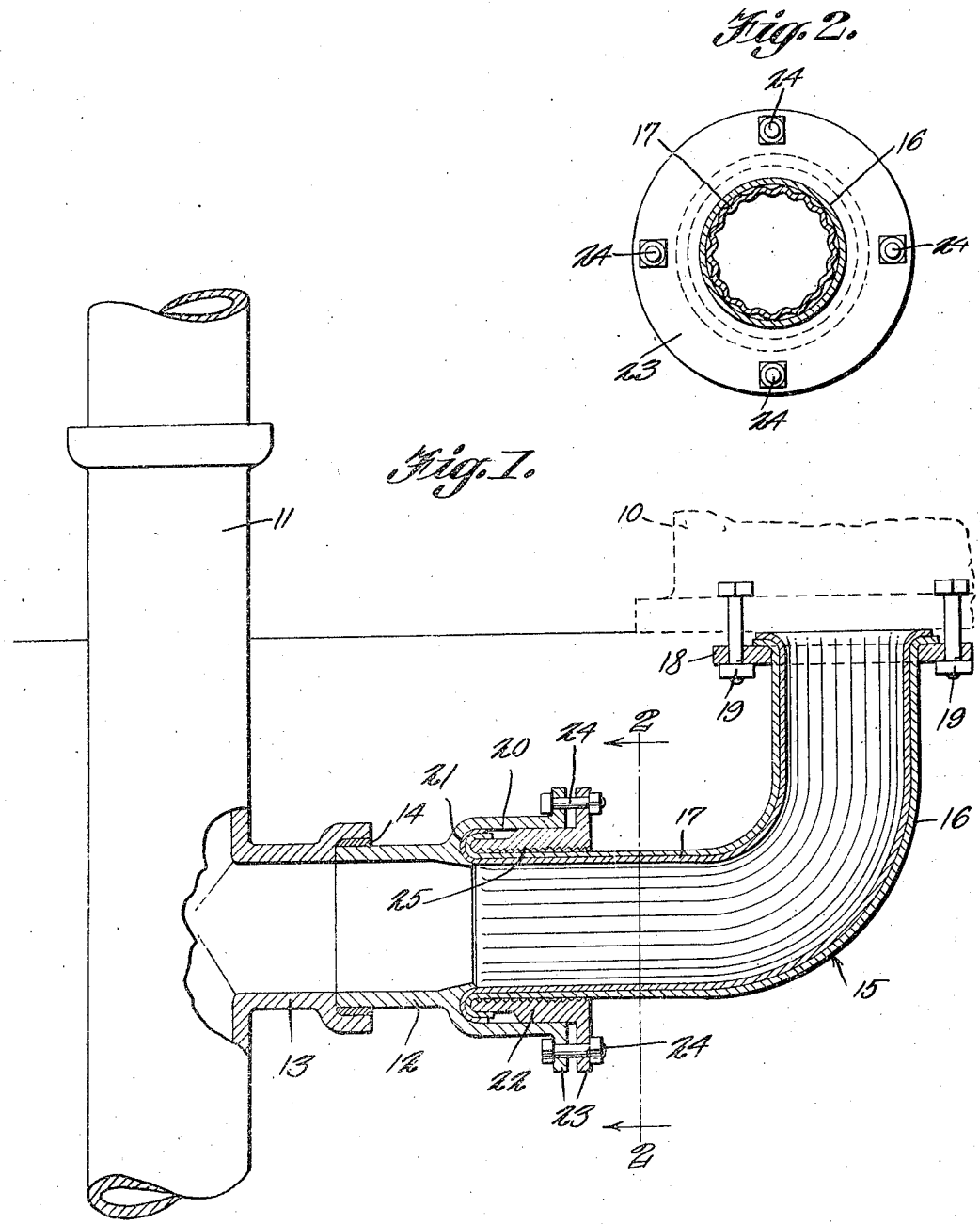

1,609,159

UNITED STATES PATENT OFFICE.

ROBERT DAWSON, OF BROOKLYN, NEW YORK.

PIPE JOINT.

Application filed May 22, 1925. Serial No. 32,170.

This invention relates to improvements in waste pipe connections for toilets, bath tubs, basins, sinks and so forth, the invention being especially designed for use in connecting toilet bowls with soil or waste pipes, where the connection is usually made between the floor and the ceiling of a room immediately beneath.

Considerable trouble and expense is experienced in waste pipe or soil pipe connections, due to leakage occasioned by poorly constructed joints, or the action of acids in waste material eating into and weakening the connection, (the latter being usually of lead).

To repair a joint of this character a section of the floor must be removed and replaced, occasioning considerable labor and expense, as well as frequently leaving an unsightly place, especially where the floor is of tile or hard wood.

To avoid these and many other disadvantages, the present invention provides a flexible pipe having a lining which will resist the action of the waste material passing through the pipe and which has an easily constructed positive connection with the waste or soil pipe.

With the above and other objects in view, the invention further includes the following novel features and details of construction, to be hereinafter more fully described, illustrated in the accompanying drawings and pointed out in the appended claim.

In the drawings:—

Figure 1 is a view partly in section and partly in elevation illustrating a waste pipe connection constructed in accordance with the invention.

Figure 2 is a section on the line 2—2 of Figure 1.

Referring in detail to the drawings wherein like characters of reference denote corresponding parts, the reference character 10 indicates a portion of a toilet bowl illustrated by dotted lines, while 11 indicates a portion of a soil or waste pipe to which the bowl is connected. This connection is effected by the use of a ferrule 12 of brass or other suitable material which has one of its ends joined with an extension or hub 13 carried by the soil pipe 11, the joint being calked as indicated at 14. The opposite end of the ferrule 12 is connected to one end of a flexible pipe section 15, the opposite end of the latter being connected with the outlet of the bowl 10.

This flexible pipe section is of novel construction and comprises an outer lead casing 16 and an inner lining 17, the latter preferably consisting of tinned copper and having longitudinally extending corrugations therein. This lining will resist the action of acids contained within the waste matter passing through the pipe, which acids frequently cause a lead pipe section to become crystallized or porous. The lead casing is thus protected and its advantages for connections of this kind retained as it is easier to cut and makes a much better and snug fitting connection than other materials. By corrugating the lining 17 expansion and contraction is provided for.

Connection with the bowl 10 is effected by bending the pipe 15 outward and clamping the same to the bottom of a bowl by means of an annulus 18 and bolts 19.

Connection between the ferrule 12 and the flexible pipe section 15 is effected by providing an enlarged bore 20 at the outer end of the ferrule and forming a transversely curved annular seat 21 at the inner end of this enlarged bore. Surrounding the adjacent end of the flexible pipe section 15 is a clamping collar 22 and the extremity of the pipe section 15 is turned over the inner end of this collar. The collar 22 and the adjacent end of the ferrule 12 are both provided with flanges 23 which receive bolts 24. By adjusting these bolts the collar 22 is forced inward to force the outwardly turned extremity of the pipe section 15 within the seat 21 so that a leakproof joint is provided. If desired, a gasket 24 may be interposed between the flanges 23.

The bore of the sleeve 22 is preferably threaded as indicated at 25, so that in the event the bowl is disconnected, a plug may be threaded into the sleeve to close the end of the ferrule.

The invention is susceptible of various changes in its form, proportions and minor details of construction and the right is herein reserved to make such changes as properly fall within the scope of the appended claim.

Having described the invention what is claimed is:—

In a waste pipe connection, the combination with a rigid pipe section provided with an enlarged bore at one of its ends having a shoulder at its inner end, the shoulder being arcuate in cross section, of a pliable pipe section consisting of a pliable outer wall of lead and a pliable inner wall of tinned copper, an end of this pliable pipe section extending within the enlarged bore of the rigid pipe section and provided with a rolled flange corresponding in shape and engaging said shoulder, a clamping sleeve fitting on the pliable pipe section and being frictionally fitted into the enlarged bore and having an inner reduced terminal end over which the rolled flange engages, and means for tightening the sleeve within the enlarged wall and binding the rolled flange in place, the sleeve having internal threads adapted to receive a plug when the pliable pipe section is removed.

In testimony whereof I affix my signature.

ROBERT DAWSON.